United States Patent [19]
Braunschweig et al.

[11] 4,021,753
[45] May 3, 1977

[54] FREE EXPANSION NOZZLE FOR GAS DYNAMIC LASERS

[75] Inventors: Ernie D. Braunschweig, Alburquerque, N. Mex.; Robert E. Wilson, Brea, Calif.

[73] Assignee: The United States of America as represented by the Secretary of the Air Force, Washington, D.C.

[22] Filed: Apr. 8, 1975

[21] Appl. No.: 566,160

[52] U.S. Cl. .................... 331/94.5 D; 331/94.5 G
[51] Int. Cl.² ........................................ H01S 3/02
[58] Field of Search ............. 331/94.5 G, 94.5 R, 331/94.5 PE, 94.5 D; 330/4.3; 329/556, 557

[56] References Cited
UNITED STATES PATENTS 3,720,885  3/1973  Koloc ................. 331/94.5 PE
3,760,294  9/1973  Roberts et al. ............. 331/94.5 P
3,962,656  6/1976  Peressini et al. ........... 331/94.5 PE

FOREIGN PATENTS OR APPLICATIONS 2,226,392  12/1973  Germany .................. 331/94.5 P Primary Examiner—William L. Sikes
Attorney, Agent, or Firm—Joseph E. Rusz; Jacob H. Erlich

[57] ABSTRACT

A free expansion nozzle for gas dynamic lasers having a multitude of finely divided free expansion sites. These sites may be in the form of a plurality of minute openings within a plate, or minute spacings between adjacent cylinders, or in the form of a small mesh screen. In any case these expansion sites may be situated within the nozzle section of a gas dynamic laser, thereby providing an easily fabricated, economical means of producing a lasing medium within the optical cavity of the laser.

9 Claims, 7 Drawing Figures

FREE EXPANSION NOZZLE FOR GAS DYNAMIC LASERS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly, to a free expansion nozzle for use within a gas dynamic laser.

Since the development of the first working lasers, considerable time and effort has been expended in the search for higher output laser systems. The possible applications of high power lasers are unlimited in the fields of communication, manufacturing, construction, medicine, space exploration, and defense. Unfortunately many obstacles exist to the attainment of high power systems. Most lasers have a low efficiency and therefore to obtain high power or high energy outputs, considerably more energy must be furnished to the system than is extracted. If this energy furnished is electrical, then the system cannot have a large average power and still be portable, as is desired in some cases. The relative size and weight of laser systems, and the availability of materials, have also introduced obstacles to their development The gas dynamic laser has grown out of the initial laser effort and is representative of one of the more sophisticated laser techniques which has the capability of providing very high power radiation output, due primarily to the large gas handling capability characteristic of such a system and due to the large quantity of energy which can be added to the gases flowing in such systems.

Gas laser operation requires that a population inversion be established between upper energy levels and lower energy levels of the lasing medium. One example of such a laser would be the carbondioxide-nitrogen laser. Recent experimental investigations into gas lasers have shown that photon emission necessary for laser operation may be achieved by the resonant transfer of energy, through collisions, from a first gaseous substances, designated the "energizing substance" such as vibrationally excited molecular nitrogen ($N_2$), to a second substance designated the "lasing substance" such as carbon dioxide ($CO_2$). These experiments have shown that nitrogen and $CO_2$ may be fully mixed together, such as in a fully mixed gaseous plasma, while the substances in this mixture are raised to respective specific energy levels, favorable to laser emission, as a result of the electron collisions in an electronic plasma. Also, it has been known to combust a complex substance such as cyanogen so as to generate carbon dioxide and molecular nitrogen with the molecular nitrogen in a highly energized state favorable to energizing the $CO_2$ for laser emission. In either case, it is necessary that the nitrogen have sufficient energy in its vibrational mode so as to impart a substantial amount of energy to $CO_2$ in the 001 state, which is commonly referred to as the upper laser level for $CO_2$ molecules. The very efficient energy transfer between the nitrogen and the carbon dioxide results from a near identity of the energy spacing of certain of the vibrational states of these two substances.

Thus, in the present state of the high power gas laser art, lasing (which is the coherent stimulated emission of quanta of light energy) of one substance results from that substance being brought to a high, nonequilibrium energy state as a result of collisions with an energizing gas excited to a vibrational energy level which closely matches an energy level of the lasing substance (i.e., the upper lasing level in $CO_2$). Simply stated, at least one $CO_2$ molecule which is present in a region of population inversion will spontaneously emit a photon with an energy equal to the difference between the upper laser energy laser energy level and the lower laser energy level for a $CO_2$ molecule. This is a quantum of light energy which is reflected back and forth in the optical cavity. The photon will impinge on another $CO_2$ molecule and cause a rapid, stimulated emission of a second photon. This photon is also reflected back and forth in the optical cavity, and so forth which brings about a continuing avalanche of stimulated photon emission, at the lasing wavelength. This sequence will occur nearly instantaneously so that lasing is established in say, nanoseconds. The useful laser output is derived by coupling light energy out of the oscillating and/or amplifying optical cavity.

Within the gas dynamic laser an optically active medium is created by rapidly expanding vibrationally excited gas mixtures through an array of two-dimensional nozzles. Typically, the nozzles array consists of a large number of small nozzle blades characterized by extremely small throat heights and isentropic contours. Each nozzle being critically machined to have a throat area of, for example, 0.012 inches, a length of 3 to 4 inches and a flow contour of 1 inch. Precision machining of the nozzle blades is therefore extremely costly and maintaining these critical tolerances during gas dynamic laser operation is difficult.

SUMMARY OF THE INVENTION

The instant invention provides an easy-to-fabricate replacement for the expensive slit nozzle arrays presently used with gas dynamic lasers and thereby overcomes the problems encountered in the past and as set forth in detail hereinabove.

This replacement is in the form of a finely divided array of free expansion sites which produces a supersonic flow of optically active gases in the optical cavity of a gas dynamic laser. By freely expanding the vibrationally excited gases through a series of apertures this invention produces a lasing medium within the optical cavity without the manufacturing complexities of the nozzle blades heretofore in existence.

The instant invention takes the form of three configurations that can be used to produce this optically active medium by freely expanding the flow of gas. One such configuration is made up of an aperture plate having a series of axisymmetric openings therein. Flow entering the holes or openings is compressed and reaches sonic velocity at the exit, then freely expands to supersonic velocity, producing the lasing medium. Another configuration of the invention involves a series of closely spaced cylinders, while the third configuration takes the form of a very small mesh screen. In all cases, the instant invention provides a finely divided distribution of free expansion sites without relying on specific contour control as with nozzles of the past.

It is therefore an object of this invention to provide a free expansion nozzle for a gas dynamic laser having a multitude of openings uniformly distributed so as to effect a homogeneous gas flow within the optical cavity of the laser.

It is another object of this invention to provide a free expansion nozzle for a gas dynamic laser which is extremely easy to fabricate.

It is a further object of this invention to provide a free expansion nozzle for a gas dynamic laser which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE PREFERRED EMBODIMENT

Figure 1:
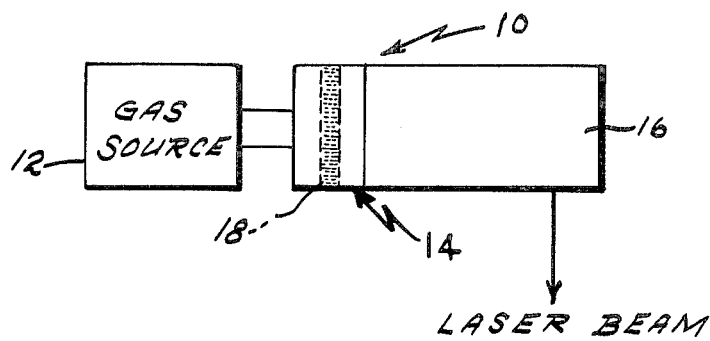
FIG. 1 is a schematic representation of a gas dynamic laser incorporating therein the free expansion nozzle of this invention.

Reference is now made to FIG. 1 of the drawing which shows in schematic fashion a gas dynamic laser 10. Laser 10 is formed of three essential elements: (1) at least one gas source 12; (2) a nozzle section 14; and (3) an optical or resonant cavity 16 from which the laser beam emerges. Within nozzle section 14 is located the free expansion nozzle 18 of this invention.

Contrary to the nozzles of the past which consist of an array of two-dimensional nozzles machined to extremely close tolerances, free expansion nozzle 18 of this invention not only eliminates the requirement of isentropic contours of the past but also thereby eliminates the extremely costly manufacturing procedures involved in maintaining these critical tolerances during construction thereof. By providing a multitude of openings within the nozzle 18 of this invention, a homogeneous gas flow exists within the optical cavity 16 of gas dynamic laser 10.

Figure 2:
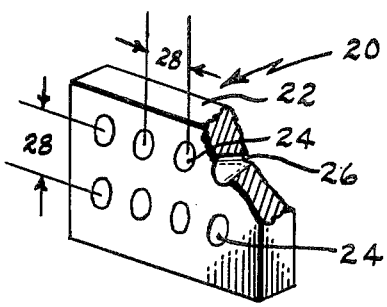
FIG. 2 is a pictorial representation of the aperture plate free expansion nozzle of this invention shown partly in cross-section.
Figure 3:
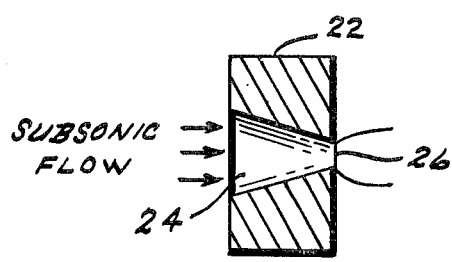
FIG. 3 is a side elevational view, shown partly in cross-section, of an aperture within the aperture plate free expansion nozzle shown in FIG. 2.

One embodiment of the instant invention is best shown in FIGS. 2 and 3 of the drawing. These figures show a free expansion nozzle 20 made up of a nozzle member 22 having a multitude of openings 24 located therein. These openings are preferably of a tapered configuration having the diameter of the smaller end 26 in the range of 0.001–0.015 inches in size and preferably approximately 0.004 inches. Nozzle 20 has the mid point of adjacent openings 24 spaced a distance 28 in the range of between 0.005–0.15 inches apart. For optimum results it is preferable that this distance 28 be approximately 0.03 inches. Another limitation of the free expansion nozzle 20 of this invention is that the ratio between the cross-sectional area, A, of nozzle section 14 of laser 10 and the total cross-sectional area, A*, of openings 24 be in the range of between 25–100.

Figure 4:
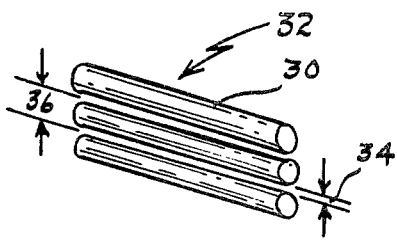
FIG. 4 is a pictorial representation of the cylindrical free expansion nozzle of this invention.
Figure 5:
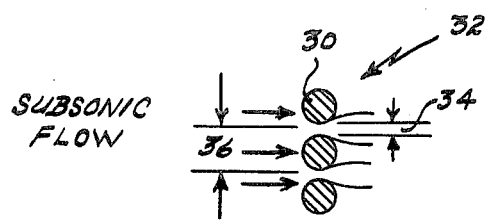
FIG. 5 is a side elevational view, shown in cross-section of the cylindrical free expansion nozzle shown in FIG. 4.

Free expansion nozzle 18 of this invention can also take on the configuration of a plurality of closely spaced cylinders 30 as shown in the cylindrical free expansion nozzle 32 of FIGS. 4 and 5. Although nozzle member 30 of FIGS. 4 and 5 is of a slightly different configuration than the nozzle member 22 of FIGS. 2 and 3, the range set forth in FIGS. 2 and 3 with respect to the size of openings remain the same. That is, spacing 34 should fall within the range of between 0.001–0.015 inches. Space 36 falls within the range of between 0.025–0.9 inches.

Figure 6:
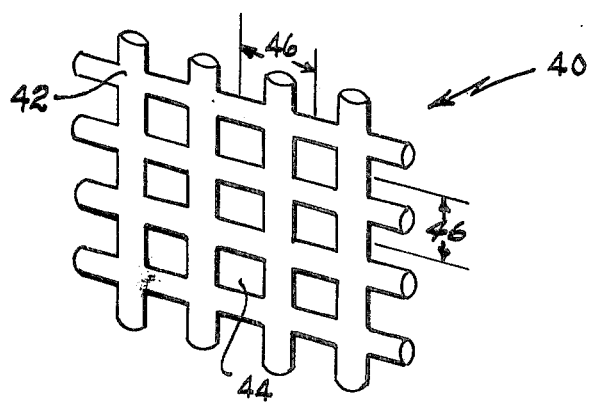
FIG. 6 is a pictorial representation of the screen free expansion nozzle of this invention.
Figure 7:
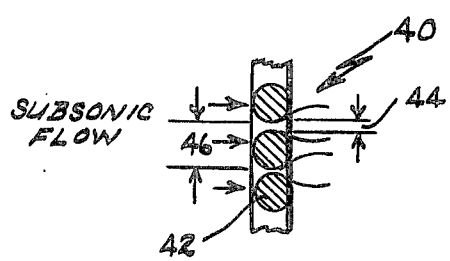
FIG. 7 is a side elevational view, shown partly in cross-section of the screen free expansion nozzle shown in FIG. 6.

Another embodiment of this invention is in the form of a screen free expansion nozzle 40 as shown in FIGS. 6 and 7 of the drawing. In this embodiment a very small mesh screen 42 is placed within nozzle section 14 of laser 10. This screen has the size of the opening 44 within the range of 0.001–0.015 inches while maintaining a spacing 46 between the mid points thereof of between 0.005–0.15 inches.

In all embodiments of this invention the flow entering the opening 24, for example, is compressed and will reach sonic velocity at the exit thereof, then, this flow of gases freely expands to supersonic velocity, producing a medium in optical cavity 16 within laser 10 which is capable of sustaining a laser action. No requirement exists in the instant invention for critical isentropic or flow contours which were so necessary with the nozzles of the past. The ease of fabrication and reduction in cost of the free expansion nozzle of this invention are its principal advantages and therefore finds application within the gas dynamic laser systems in use today.

Although this invention has been described with reference to particular embodiments it will be understood to those skilled in the art that this invention is also capable of a variety of alternate embodiments within the spirit and scope of the appended claims.

We claim:

1. In a gas dynamic laser having at least one gas source providing a gas for said laser, a nozzle section and a resonant cavity the improvement therein being a free expansion nozzle mounted within said nozzle section, said free expansion nozzle comprising a nozzle member, said nozzle member having means located therein capable of elevating said gas flowing therethrough to a supersonic velocity, said means being in the form of a multitude of free expansion sites uniformly distributed within said nozzle section to effect a homogeneous gas flow in said resonant cavity, each of said sites being an opening in the range of 0.001–0.015 inches in size and spaced apart a distance in the range of 0.005–0.15 inches between mid point thereof and where the ratio between the cross-sectional area of said nozzle section and the total cross-sectional area of said openings in said nozzle member is in the range of 25–100, whereby said gas, after passing through said free expansion nozzle and being elevated to a supersonic velocity thereby provides a medium capable of sustaining a lasing action within said resonant cavity.

2. In a laser as defined in claim 1 wherein the size of each of said openings within said nozzle section is approximately 0.004 inches.

3. In a laser as defined in claim 2 wherein the distance between the midpoint of adjacent openings is approximately 0.03 inches.

4. In a laser as defined in claim 2 wherein said nozzle member is in the form of a plate, said plate containing said openings therein.

5. In a laser as defined in claim 1 wherein each of said openings within said nozzle section are axisymmetric.

6. In a laser as defined in claim 1 wherein said nozzle member comprises a plurality of closely spaced cylinders.

7. In a laser as defined in claim 6 wherein the size of the space between said cylinders is approximately 0.004 inches.

8. In a laser as defined in claim 1 wherein said nozzle member is in the form of a mesh screen.

9. In a laser as defined in claim 8 wherein the size of each of said openings of said mesh screen are approximately 0.004 inches.

* * * * *